Oct. 7, 1924.
R. BOUSQUET
1,510,825
TRANSMISSION DRUM BAND
Filed March 19, 1924
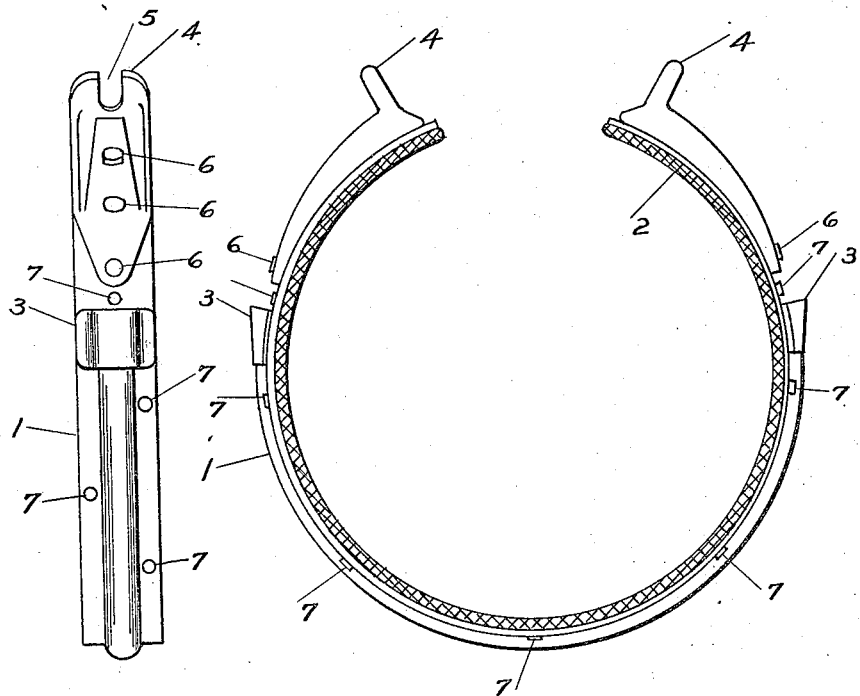
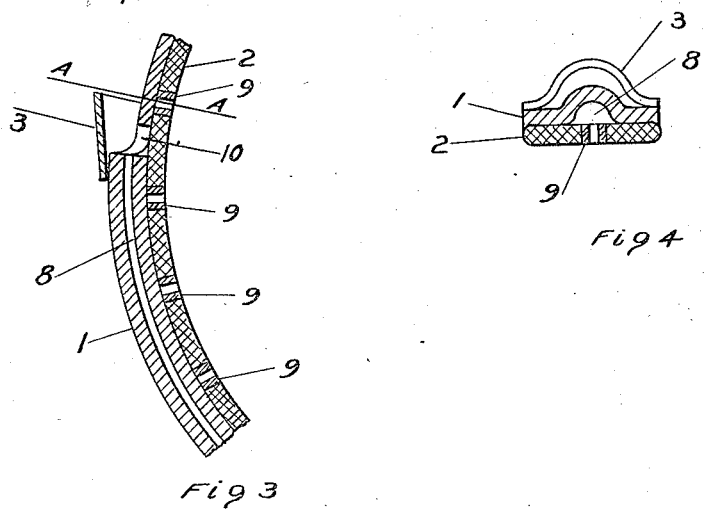
INVENTOR
RALPH BOUSQUET
BY
Oscar T. DeWitt
ATTORNEY Patented Oct. 7, 1924.

1,510,825

UNITED STATES PATENT OFFICE.

RALPH BOUSQUET, OF PITTSFIELD, MASSACHUSETTS.

TRANSMISSION-DRUM BAND.

Application filed March 19, 1924. Serial No. 700,389.

*To all whom it may concern:*

Be it known that I, RALPH BOUSQUET, a citizen of the United States, residing at Pittsfield, in the county of Berkshire and State of Massachusetts, have invented certain new and useful Improvements in Transmission-Drum Bands, of which the following is a specification.

My invention is in the nature of an improved transmission drum band more especially adapted to be used with a Ford car. The purpose of the invention is to provide a transmission drum band, that is so well lubricated by means of forcing oil through an oil channel on the transmission drum band, that the brake lining and the transmission drum are constantly working on a well lubricated surface.

Another feature of my invention is that the brake lining and the transmission drum being in contact with each other, and the surface of both well lubricated, will cause the automobile to move freely with a steady motion and without chattering or jumping which is commonly found in a Ford automobile that is equipped with an ordinary transmission drum band.

Another feature of my invention is that by well lubricating the brake lining and the transmission drum surface will prevent the brake lining from burning, therefore increasing the efficiency of my improved transmission drum band over the ordinary transmission drum band.

Figure 1 is a side elevation view of my invention. Figure 2 is a front elevation view of my invention. Figure 3 is an enlarged sectional view showing the oil channel and the brake lining. Figure 4 is a sectional view of Figure 3 taken on the line A—A.

Referring to the accompanying drawing, in which like numerals indicate like parts 1 is the transmission drum band and the said band is provided with an oil channel 8, which channel runs about three-fourths or more of the way around the said transmission band. The channel 8 is formed in the center of the transmission band, and the upper part of the channel is brought just inside of the scoop 3. The upper part of the transmission band 1 above the channel depression is flat, and secured to the upper part of the flat portion of the transmission band, by rivets 6 or other means, are two clamping supports 4. These supports are each provided with a slot 5 for the purpose of inserting the clamping means, said clamping means used for the purpose of clamping the brake lining and the transmission band around the transmission drum.

An oil tight scoop 3, which is open on the upper end, is secured to the transmission band 1 by welding or other means, and the said scoop acts as a supply retainer for the oil that is forced into and through the channel 8. That portion of the transmission band, which is just inside the scoop 3 and at the top of the channel 8, is provided with an oil outlet 10 to provide means whereby the oil inside the scoop can freely pass from the supply container into the channel 8.

A brake lining 2, which may consist of any suitable material, is secured to the transmission band 1 by means of rivets 7. The brake lining is provided with small plugs 9 which plugs are provided with an orifice which orifice comes directly over the channel 8. These small orifices allow the oil from the channel to pass through the brake lining and come in contact with the transmission drum thereby causing the necessary lubrication between the brake lining and the transmission drum. Various kinds of brake lining may be used, and all that is necessary for the successful operation of my invention is to perforate the brake lining directly over the channel in the transmission drum band. It is to be understood that the brake lining is introduced to show the operation of my invention and is not claimed as part of my invention.

My invention is operated as follows: After the transmission band is set in position around the transmission drum and the motor set in motion, the flywheel being immersed in oil will cause a constant splashing of oil and the oil will be caught and retained by the scoop 3. The scoop being constantly filled with oil will cause a steady stream of oil to flow through the channel 8, and the oil will naturally flow to the lower part of the transmission drum band, thereby lubricating the brake lining and the transmission band where the greatest amount of friction occurs.

With the ordinary make of transmission drum bands the brake lining at the top of the band becomes frayed and has a tendency to wipe the oil from the surface of the transmission drum and retard it from flowing to the lower portion of the drum. By running a channel in the center and around the transmission drum band I have overcome this disadvantage and greatly increased the efficiency and operation of the transmission drum band.

Having thus described my invention, I claim:—

1. A transmission drum band comprising a circular band open at the top with an oil channel depressed thereon and running three-fourths the way around said band, the upper ends of the said band being flat with clamping supports attached thereto, oil supply retainers placed diametrically opposite each other and attached to the depressed and to the flat portions of the said circular band.

2. A transmission drum band comprising a circular band open at the top with an oil channel depressed thereon in the center of the band and running three-fourths the way around said band, the upper ends of the said band being flat with clamping supports attached thereto and said clamping supports provided with slots, oil supply retainers attached to the circular band, and said circular band provided with an oil outlet to allow the oil to flow from the oil retainers into the channel depressed on the said circular band.

In testimony whereof I set my hand and signature.

RALPH BOUSQUET.